(12) United States Patent
Fujiki et al.

(10) Patent No.: US 9,410,457 B2
(45) Date of Patent: Aug. 9, 2016

(54) FLOW CONTROL VALVES

(71) Applicant: AISAN KOGYO KABUSHIKI KAISHA, Obu-shi, Aichi-ken (JP)

(72) Inventors: Hiroshi Fujiki, Obu (JP); Takashi Masuda, Obu (JP)

(73) Assignee: AISAN KOGYO KABUSHIKI KAISHA, Obu-Shi, Aichi-Ken (JP)

( * ) Notice: Subject to any disclaimer, the term of this patent is extended or adjusted under 35 U.S.C. 154(b) by 610 days.

(21) Appl. No.: 13/646,756

(22) Filed: Oct. 8, 2012

(65) Prior Publication Data

US 2013/0087222 A1 Apr. 11, 2013

(30) Foreign Application Priority Data

Oct. 7, 2011 (JP) .................................. 2011-222963

(51) Int. Cl.
*G05D 7/01* (2006.01)
*F01M 13/00* (2006.01)
(Continued)

(52) U.S. Cl.
CPC ............ *F01M 13/0011* (2013.01); *F16K 17/30* (2013.01); *F16K 17/34* (2013.01); *G05D 7/0133* (2013.01); *Y10T 137/7792* (2015.04); *Y10T 137/7922* (2015.04); *Y10T 137/7932* (2015.04)

(58) Field of Classification Search
CPC . F01M 13/023; F01M 13/0011; F02M 25/06; Y10T 137/7785; Y10T 137/7932; Y10T 137/7933; Y10T 137/7934; Y10T 137/7938; Y10T 137/7922; Y10T 137/7792; G05D 7/0133; G05D 7/014; F16K 17/22; F16K 17/24; F16K 17/26; F16K 17/28; F16K 17/30; F16K 17/34
USPC ............. 123/574; 137/498, 542, 543, 543.13, 137/543.21, 504
See application file for complete search history.

(56) References Cited

U.S. PATENT DOCUMENTS 3,241,537 A * 3/1966 Jones .............................. 123/572
3,359,960 A * 12/1967 Pittsley ......................... 123/574
(Continued)

FOREIGN PATENT DOCUMENTS

JP 542226 U 1/1979
JP 592581 U 12/1993
(Continued)

OTHER PUBLICATIONS

Japanese Office Action mailed Jan. 27, 2015, corresponding to Japanese Patent Application No. 2011222963.
(Continued)

*Primary Examiner* — William McCalister
(74) *Attorney, Agent, or Firm* — Ladas & Parry LLP

(57) ABSTRACT

A flow control valve may include a case and a valve body axially movably disposed within a fluid passage defined in the case. The valve body may have an outer circumferential surface with a flow control surface. The valve body may further include a flange portion positioned on an upstream side of the flow control surface. The flange portion may include a sliding surface and a reference surface. The sliding surface may slidably contact a passage wall surface of the fluid passage. The reference surface may serve as a reference when performing configuration measurement of the flow control surface. The reference surface may extend within a first circumferential range about the axis of the valve body, and the flow control surface may extend within a second circumferential range about the axis of the valve body. The first circumferential range and the second circumferential range may at least partly overlap with each other.

11 Claims, 4 Drawing Sheets

(51) Int. Cl.
  *F16K 17/30* (2006.01)
  *F16K 17/34* (2006.01)

(56) References Cited

U.S. PATENT DOCUMENTS

| | | | | |
|---|---|---|---|---|
| 3,659,573 | A | * | 5/1972 | Bennett .......................... 123/574 |
| 3,735,777 | A | * | 5/1973 | Katzer ................... F16K 17/34 |
| | | | | 137/514.5 |
| 3,766,898 | A | * | 10/1973 | McMullen .................... 123/574 |
| 4,502,452 | A | * | 3/1985 | Whitehead .................... 123/574 |
| 4,625,703 | A | * | 12/1986 | Otto et al. ...................... 123/574 |
| 4,905,657 | A | * | 3/1990 | Betterton et al. ............. 123/574 |
| 5,551,476 | A | * | 9/1996 | McGinnis ............... F16K 17/30 |
| | | | | 137/498 |
| 2003/0213479 | A1 | * | 11/2003 | Wade ............................ 123/572 |
| 2013/0087222 | A1 | * | 4/2013 | Fujiki et al. ................... 137/535 |

FOREIGN PATENT DOCUMENTS

| | | |
|---|---|---|
| JP | 2001303922 A | 10/2001 |
| JP | 2007120660 A | 5/2007 |
| JP | 2007-182939 | 7/2007 |

OTHER PUBLICATIONS

Journal of Technical Disclosure No. 99-6907, Oct. 1, 1999.
Chinese Office Action issued Apr. 16, 2015, corresponding to Chinese Patent Application No. 201210372202.

\* cited by examiner

FLOW CONTROL VALVES

This application claims priority to Japanese patent application serial number 2011-222963, the contents of which are incorporated herein by reference.

BACKGROUND OF THE INVENTION

1. Field of the Invention

The present invention relates to a flow control valve for controlling the flow rate of a fluid.

2. Description of the Related Art

A known positive crankcase ventilation system, for example, of an internal combustion engine of a vehicle, such as an automobile, employs a positive crankcase ventilation (PCV) valve as a flow control valve for controlling the flow rate of blow-by gas (see, for example, JP-A-2007-182939).

A known PCV valve disclosed in JP-A-2007-182939 will be described. FIG. 12 is a sectional view of the known PCV valve. As shown in FIG. 12, a PCV valve 1 is equipped with a case 2, a valve body 3, and a spring 4. Provided in the case 2 is a cylindrical gas passage 5 extending in the axial direction (in the horizontal direction as seen in FIG. 12. Blow-by gas may flow through the gas passage 5. The valve body 3 is disposed inside the gas passage 5 so as to be capable of advancing and retreating in the axial direction. The spring 4 is interposed between the case 2 and the valve body 3 in order to urge the valve member 3 in the retreating direction (to the right as viewed in FIG. 12). In the gas passage 5, there is coaxially formed a cylindrical measurement hole 5a. Further, a coaxial tapered measurement surface 3a is formed on the valve body 3. A measurement portion 6 is defined by the measurement hole 5a and the measurement surface 3a. Further, a cylindrical passage wall surface 5b is formed in the case 2 on the upstream side of the measurement portion 6 of the gas passage 5.

The PCV valve 1 may control or measures the flow rate of the blow-by gas flowing through the gas passage 5 by adjusting the flow passage sectional area of the measurement portion 6 through the advancement and retreat of the valve body 3. Further, three radial ribs 7 (two of which are shown in FIG. 12) are formed on the measurement surface 3a of the valve body 3 and extend linearly in the axial direction of the valve body 3. The outer end surfaces of the ribs 7 (the end surfaces situated on the outer peripheral side of the valve body 3) can slidably contact the inner peripheral surface of the measurement hole 5a. Further, at the rear end portion of the valve body 3 (the right end portion in FIG. 12), there are formed three protrusions 8 (two of which are shown in FIG. 12) protruding radially outwards. The outer end surfaces (the end surface situated on the outer peripheral side of the valve body 3) can slidably contact the passage wall surface 5b on the upstream side of the gas passage 5. Accordingly, when the valve body 3 advances or retreats, the ribs 7 come into sliding contact with the inner peripheral surface of the measurement hole 5a, and protrusions 8 come into sliding contact with the passage wall surface 5b on the upstream side of the gas passage 5, whereby the valve body 3 is guided along the axial direction. As a result, it is possible to prevent radial run-out of the valve body 3, whereby it is possible to improve the stability in operation of the valve body 3. Further, openings 9 through which blow-by gas flow are formed by spaces between the protrusions 8 adjacent to each other in the circumferential direction of the valve body 3.

In the above known PCT valve 1, three radial ribs 7 are formed on the measurement surface 3a of the valve body 3, so that, when checking the configuration of the measurement surface 3a of the valve body 3 by using a configuration measurement apparatus, the measurement needle of the configuration measurement apparatus may trace along the measurement surface 3a in the axial direction of the valve body 3. However, the outer end surfaces of the protrusions 8 of the valve body 3 are configured as arcuate surfaces that slidably contact the passage wall surface 5b on the upstream side of the gas passage 5, so that, at the time of the configuration measurement of the measurement surface 3a, they cannot be used as reference surfaces. Thus, the configuration of the measurement surface 3a cannot be easily checked.

Therefore, there has been a need in the art for a flow control valve having a valve body that allows configuration measurement of a measurement surface of the valve body while the valve body can operate in stable.

SUMMARY OF THE INVENTION

In one aspect according to the present teachings, a flow control valve may include a case and a valve body axially movably disposed within a fluid passage defined in the case. The valve body may have an outer circumferential surface with a flow control surface. The valve body may further include a flange portion positioned on an upstream side of the flow control surface. The flange portion may include a sliding surface and a reference surface. The sliding surface may slidably contact a passage wall surface of the fluid passage. The reference surface may serve as a reference when performing configuration measurement of the flow control surface. The reference surface may extend within a first circumferential range about the axis of the valve body, and the flow control surface may extend within a second circumferential range about the axis of the valve body. The first circumferential range and the second circumferential range may at least partly overlap with each other. In other words, the control surface and the reference surface may overlap each other at least partially with respect to a radial direction of the valve body in a front view of the valve body

DETAILED DESCRIPTION OF THE INVENTION

Figure 1:
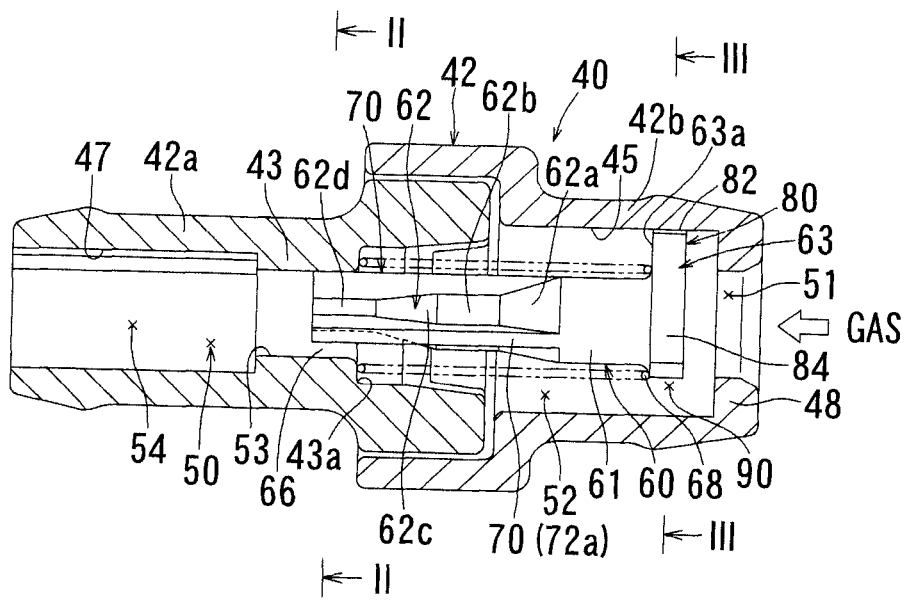
FIG. 1 is a sectional view of a PCV valve according to an embodiment.

Each of the additional features and teachings disclosed above and below may be utilized separately or in conjunction with other features and teachings to provide improved flow control valves. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful examples of the present teachings. Various examples will now be described with reference to the drawings.

In one embodiment, a flow control valve may include a case defining therein a cylindrical fluid passage, a valve body disposed within the fluid passage so as to be capable of axially advancing and retreating, and a spring urging the valve body in a retreating direction, wherein. The fluid passage may include a cylindrical measurement hole. The valve body may have an outer circumferential surface including a tapered measurement surface, so that a measurement region is defined between an inner circumferential wall of the measurement hole and the tapered measurement surface of the valve body. A flow rate of fluid flowing though the fluid passage may be controlled by adjusting a passage sectional area of the measurement region through axial movement of the valve body. The valve body may include a front side guide and a rear side guide. The front side guide may include a plurality of rib portions protruding radially from the measurement surface of the valve body and having sliding surfaces configured to slidably contact the inner circumferential wall of the measurement hole. The rear side guide may include a flange portion formed on a rear end portion of the valve body. The flange portion may include a sliding surface and a cutout surface. The sliding surface may slidably contact a passage wall surface of the fluid passage located on an upstream side of the measurement hole. An opening may be defined between the cutout surface and the passage wall surface for allowing flow of the fluid. The cutout surface may include a reference surface serving as a reference when performing configuration measurement of the measurement surface. The measurement surface and the reference surface may be arranged such that they overlap each other at least partially with respect to the radial direction of the valve body in a front view of the valve body.

With this construction, when the valve body advances or retreats, the sliding surfaces of the rib portions of the front side guide may slide along the inner circumferential surface of the measurement hole of the case, and the flange portion of the rear side guide may slide along the upstream side passage wall surface of the fluid passage. Therefore, the valve body can be guided in the axial direction. As a result, it is possible to prevent radial run-out of the valve body, making it possible to achieve an improvement in terms of stability in operation of the valve body. Further, the cutout portion has the reference surface serving as a reference when performing configuration measurement of the measurement surface, and the measurement surface and the reference surface are arranged so as to overlap each other at least partially with respect to the radial direction of the valve body in front view of the valve body.

Therefore, it is possible to perform configuration measurement of the measurement surface of the valve body using the reference surface as a reference. Accordingly, it is possible to provide a flow control valve equipped with a valve body allowing configuration measurement of the measurement surface.

The sliding surfaces of the rib portions and the sliding surface of the flange portion may be arranged so as to overlap each other at least partially with respect to the radial direction of the valve body in front view of the valve body. With this arrangement, it is possible to further improve the stability in operation of the valve body.

The reference surface may be a flat surface extending parallel to the axis of the valve body. The flat reference surface may allow to easily perform correction of the inclination at the time of configuration measurement (tracing).

The flange portion may have a plurality of cutout portions each including the reference surface. With this construction, it is possible to perform configuration measurement on a plurality of measurement surfaces of the valve body by using a plurality of reference surfaces as a reference. The reference surfaces may be arranged at equal intervals in the circumferential direction of the valve body.

The rib portions may be arranged at equal intervals in the circumferential direction of the valve body. This arrangement may further improve the stability in operation of the valve body.

The number of rib portions may the same as the number of reference surfaces. For example, the number of rib portions and the number of reference surfaces may be both three.

The flow control valve may be a PCV valve for use in a positive crankcase ventilation system of an internal combustion engine. Therefore, it is possible to provide a PCV valve including a valve body that allows configuration measurement of the measurement surface while the valve body is stable in operation.

Figure 7:
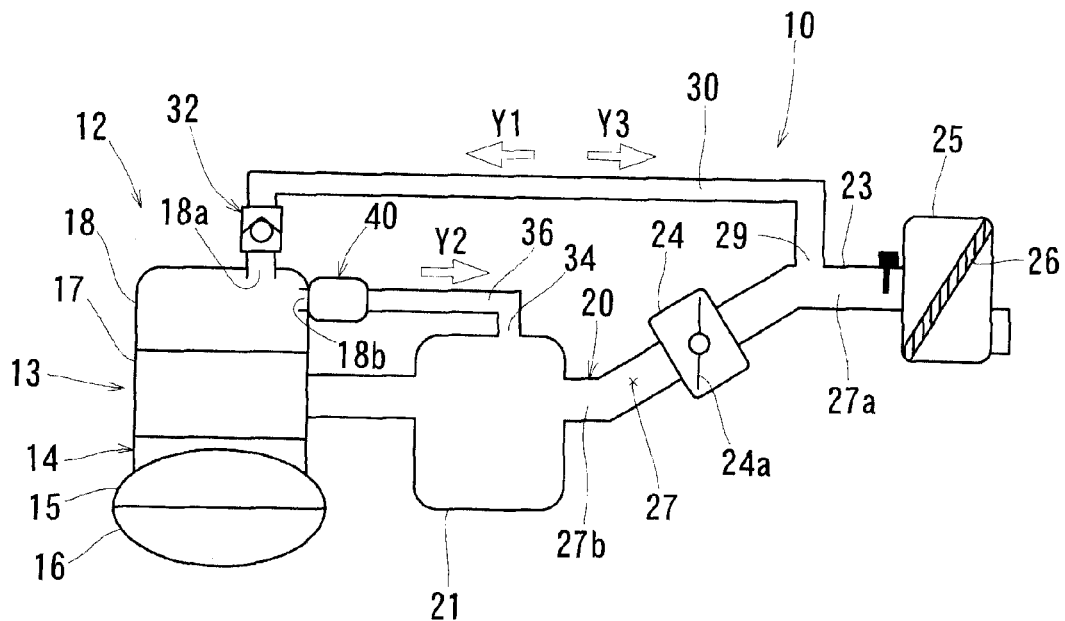
FIG. 7 is a schematic view of a positive crankcase ventilation system incorporating the PCV valve.

An embodiment will be described with reference to the drawings. In this embodiment, a flow control valve configured as a PCV valve for use in a positive crankcase ventilation system of an internal combustion engine is exemplified. For the sake of convenience in illustration, an example of the positive crankcase ventilation system will be described before describing the PCV valve. FIG. 7 is a schematic view of the positive crankcase ventilation system.

Referring to FIG. 7, in a positive crankcase ventilation system 10, if blow-by gas is leaked from a combustion chamber of an engine main body 13 of an engine 12, which may be an internal combustion engine, the blow-by gas may flow into a crankcase 15 of a cylinder block 14 and then be introduced into an intake manifold 20, so that the blow-by gas can be burnt in the combustion chamber.

The engine main body 13 may include the cylinder block 14, an oil pan 16 mounted to the lower surface side of the crankcase 15, a cylinder head 17 mounted to the upper surface side of the cylinder block 14, and a cylinder head cover 18 mounted to the upper surface side of the cylinder head 17. The engine main body 13 may generate a drive force through intake, compression, explosion, and exhaust steps in a known manner. As a result of combustion in the combustion chamber (not shown) of the engine main body 13, blow-by gas may be generated in the engine main body 13, i.e., in the crankcase 15, and in the cylinder head cover 18 communicating with the crankcase 15. The interior of the cylinder head cover 18, the crankcase 15, etc., into which blow-by gas may flow, will be hereinafter called an "interior of the engine main body".

The cylinder head cover 18 may be provided with a fresh air introduction port 18a and a blow-by gas extraction port 18b. The fresh air introduction port 18a communicates with one end (downstream end) of a fresh air introduction passage 30. The blow-by gas extraction port 18b may communicate with one end (upstream end) of a blow-by gas passage 36. The fresh air introduction port 18a and/or the blow-by gas extraction port 18b may be provided in the crankcase 15 instead of in the cylinder head cover 18.

The cylinder head 17 communicates with one end (downstream end) of the intake manifold 20. The intake manifold 20 may include a surge tank 21. The other end (upstream end) of the intake manifold 20 communicates with an air cleaner 25 via a throttle body 24 and an intake pipe 23. The throttle body 24 includes a throttle valve 24a. The throttle valve 24a may be connected to, for example, an accelerator pedal (not shown), so as to be opened or closed according to the depressing amount (operating amount) of the pedal. The air cleaner 25 serves to introduce air or so-called fresh air, and may have a filter element 26 disposed therein for filtering the fresh air. The air cleaner 25, the intake pipe 23, the throttle body 24, and the intake manifold 20 may form an intake passage 27 for introducing fresh air or intake air into the combustion chamber of the engine main body 13. Of the intake passage 27, a passage portion on the upstream side of the throttle valve 24a will be referred to as an upstream side intake passage portion 27a, and a passage portion on the downstream side of the throttle valve 24a will be referred to as a downstream side intake passage portion 27b.

A fresh air intake port 29 may be formed in the intake pipe 23. The fresh air intake port 29 communicates with the other end (upstream end) of the fresh air introduction passage 30. A check valve 32 may be disposed in the fresh air introduction passage 30. The check valve 32 allows flow of air or so-called fresh air (see arrow Y1 in FIG. 7) from the intake passage portion 27a on the upstream side into the crankcase 15 but prevents air from flowing in the reverse direction or reverse flow (see arrow Y3 in FIG. 7). Further, a blow-by gas introduction port 34 may be formed in the surge tank 21. The blow-by gas introduction port 34 communicates with the other end (downstream end) of the blow-by gas passage 36. The check valve 32 may be provided as needed, which means it may be omitted.

Next, the operation of the positive crankcase ventilation system 10 will be described. When the load on the engine 12 is a low or intermediate one, the throttle valve 24a is substantially fully closed. Thus, a negative pressure larger than that in the upstream side intake passage portion 27a (a negative pressure closer to the vacuum pressure) may be generated in the downstream side intake passage portion 27b of the intake passage 27. Accordingly, the blow-by gas produced in the engine main body 13 may be introduced into the downstream side intake passage portion 27b via the blow-by gas passage 36 (see arrow Y2 in FIG. 7). The flow rate of the blow-by gas flowing through the blow-by gas passage 36 may be controlled by a PCV valve 40 (described below).

Further, as the blow-by gas is introduced into the downstream side intake passage portion 27b from within the engine main body 13 via the blow-by gas passage 36, the check valve 32 may be opened. As a result, the fresh air in the upstream side intake passage portion 27a of the intake passage 27 may be introduced into the engine main body 13 via the fresh air introduction passage 30 (see arrow Y1 in FIG. 7). The fresh air introduced into the engine main body 13 may be thereafter introduced into the downstream side intake passage portion 27b via the blow-by gas passage 36 together with the blow-by gas (see arrow Y2 in FIG. 7). In the manner as described above, the interior of the engine main body 13 may be scavenged.

When the engine 12 is under high load, the opening amount of the throttle valve 24a is large. Accordingly, the pressure of the downstream side intake passage portion 27b of the intake path 27 may become closer to the atmospheric pressure. Therefore, the blow-by gas in the engine main body 13 may not be easily introduced into the downstream side intake passage portion 27b, and the pressure in the engine main body 13 may become to be closer to the atmospheric pressure. As a result, the flow rate of the fresh air introduced into the engine main body 13 from the upstream side intake passage portion 27a via the fresh air introduction passage 30 may decrease. Further, the check valve 32 may be closed to prevent reverse flow of the blow-by gas (see the arrow Y3 in FIG. 7) from within the engine main body 13 to the fresh air introduction passage 30.

The PCV valve 40 may be provided in the blow-by gas passage 36 and may serve as a flow control valve for controlling the flow rate of the blow-by gas. The PCV valve 40 may control the flow rate of the blow-by gas according to the difference between the upstream side pressure and the downstream side pressure of the blow-by gas, so that the blow-by gas may flow at a flow rate that is appropriate for the amount of blow-by gas generated in the engine.

Figure 2:
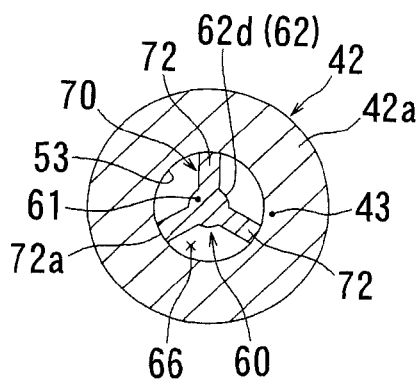
FIG. 2 is a sectional view taken along line II-II in FIG. 1.
Figure 3:
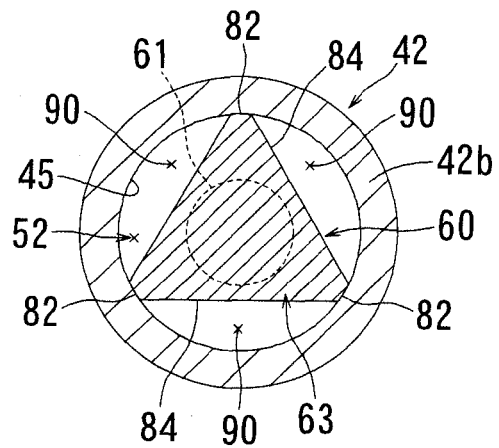
FIG. 3 is a sectional view taken along line III-III in FIG. 1.

Next, the PCV valve 40 will be described. FIG. 1 is a sectional view of the PCV valve 40, FIG. 2 is a sectional view taken along line II-II in FIG. 1, and FIG. 3 is a sectional view taken along line III-III in FIG. 1. For the purpose of explanation, the left side and the right side as viewed in FIG. 1 will be referred to as the front side and the rear side, respectively.

As shown in FIG. 1, the PVC valve 40 has a hollow cylindrical case 42 that may be made of resin. A gas passage 50 may be formed in the case 42 and extends in the axial direction of the case 42 (horizontal direction as viewed in FIG. 1). The rear end portion (the right end portion in FIG. 1) of the case 42 may be connected to an upstream-side passage portion of the blow-by gas passage 36 (see FIG. 7). The front end portion (the left end portion in FIG. 1) of the case 42 may be connected to a downstream-side passage portion of the blow-by gas passage 36. Alternatively, the rear end portion of the case 42 may be connected to the blow-by gas extraction port 18b (see FIG. 3) of the cylinder head cover 18. In any case, blow-by gas, which is a fluid, may flow through the gas passage 50. Therefore, the gas passage 50 serves as a fluid passage.

The case 42 may be divided along the axial direction into a pair of a front case half 42a and a rear case half 42b, which are joined together to form the case 42. At the central portion on the rear side of the front case half 42a, there is concentrically formed a valve seat portion 43 protruding radially inwards in a flange-like fashion. A stepped surface 43a is formed on the rear side surface of the valve seat portion 43. Inside the rear case half 42b, i.e., a gas inflow side portion (the right-hand side portion in FIG. 1) of the gas passage 50, there is formed an upstream side passage wall surface 45 having a cylindrical shape. The interior of the upstream side passage wall surface 45 serves as an upstream side passage portion 52. Further, on the front side, i.e., on the gas outflow side (the left-hand side in FIG. 1), of the valve seat portion 43 of the front side case half 42a, there is formed a downstream side passage wall surface 47 having cylindrical shape. The interior of the downstream side passage wall surface 47 serves as a downstream side passage portion 54. A cylindrical hole inside the vale seat portion 43 serves as a measurement hole 53 that is coaxial with the upstream side passage portion 52 and the downstream side passage portion 54 and communicating therebetween. Further, at the rear end portion of the rear side case half 42b, there is concentrically formed a throttle wall portion 48 protruding radially inwards in a flange-like fashion from the upstream side passage wall surface 45. A circular hole portion inside the throttle wall portion 48 serves as an inlet 51 of the gas passage 50 (more specifically, the upstream side path portion 52).

A valve body 60 may be arranged in the case 42, i.e., in the gas passage 50, so as to be capable of advancing and retreating in the axial direction (the horizontal direction as viewed in FIG. 1), that is, so as to be movable in the axial direction. The valve body 60 may be formed, for example, of resin, and may have a substantially cylindrical valve main body portion 61. A tapered measurement surface 62 is concentrically formed on the outer peripheral surface of the front portion (the left portion as seen in FIG. 1) of the valve main body portion 61. In the present embodiment, the measurement surface 62 is formed as a stepped tapered surface and includes four measurement surface portions 62a, 62b, 62c and 62d that are arranged in this order from the large diameter side (the right-hand side in FIG. 1) toward the small diameter side (the left-hand side in FIG. 1). The tapering angles of the measurement surface portions 62a through 62d may be set as appropriate. For example, one or two of the measurement surface portions 62b through 62d except for the large diameter side one may be formed as a straight surface(s) (zero tapering angle(s)). In this embodiment, the measurement surface portion 62b and 62d are formed as straight surfaces.

The front end portion (the leading end portion) of the valve main body portion 61 may be inserted into the measurement hole 53 via the upstream side passage portion 52 of the gas flow path 50. A measurement region 66 may be defined by the measurement hole 53 (more specifically, its inner peripheral surface) and the measurement surface 62 of the valve body 60. Accordingly, as the valve body 60 retreats (i.e., as it moves to the right as viewed in FIG. 1), the effective opening area of the measurement region 66, i.e., the passage sectional area, increases. Conversely, as the valve body 60 advances (i.e., as it moves to the left as viewed in FIG. 1), the passage sectional area of the measurement region 66 decreases. Therefore, the measurement region 66 may serve as a flow control region, and the measurement surface 62 may serve as a flow control surface. Further, at the rear end portion (the right end portion as viewed in FIG. 1) of the valve main body portion 61, there is formed a flange portion 63 protruding radially outwards. The flange portion 63 has the same axis as the valve main body portion 61.

A spring 68 may be interposed between the case 42 and the valve body 60. The spring 68 may be a compression coil spring and may be fitted with the valve main body portion 61 of the valve body 60. The front end portion (more specifically, the front end turn portion) of the spring 68 may engage the stepped surface 43a of the valve seat portion 43. The rear end portion (more specifically, the rear end turn portion) of the spring 68 may engage the front side end surface 63a of the flange portion 63 of the valve body 60. The spring 68 normally urges the valve body 60 in the retreating direction (to the right in FIG. 1), i.e., in the direction in which the passage sectional area of the measurement regions 66 increases. When the valve body 60 retreats to reach its rearmost position, the flange portion 63 may abuts to the throttle wall portion 48 of the rear side case half 42b of the case 42.

Figure 4:
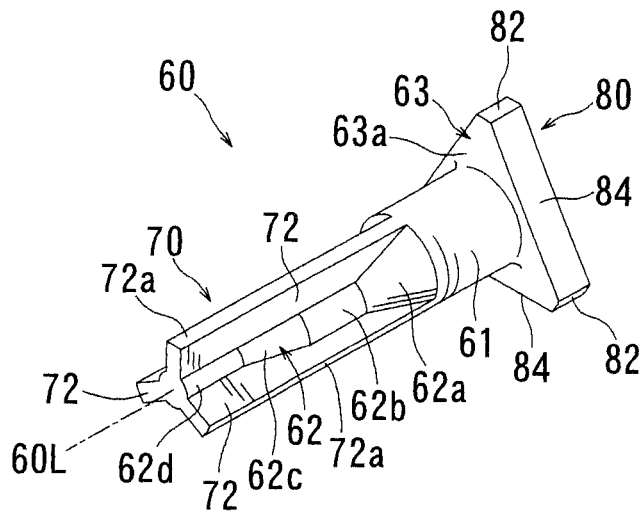
FIG. 4 is a perspective view of a valve body of the PCT valve.

The vale body 60 may include a front side guide 70 and a rear side guide 80. FIG. 4 is a perspective view of the valve body 60, FIG. 5 is a front view of the same, and FIG. 6 is a side view of the same.

Figure 5:
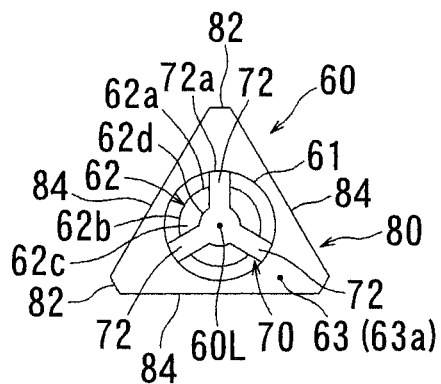
FIG. 5 is a front view of the valve body.
Figure 6:
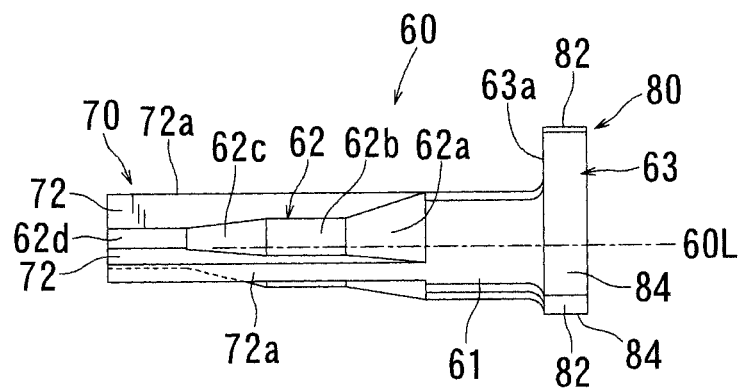
FIG. 6 is a side view of the valve body.

As shown in FIGS. 4 through 6, the front side guide 70 is formed by a plurality of (three in the present embodiment) rib portions 72 formed on the measurement surface 62 of the valve body 60 and extending in a radial direction therefrom. The outer end surfaces of the rib portions 72 (the end surfaces situated on the outer peripheral side of the valve body 60) serve as sliding surfaces 72a. The sliding surfaces 72a can slidably contact the inner peripheral surface of the measurement hole 53 (see FIG. 2). The sliding surfaces 72a of the rib portions 72 are positioned within the same cylindrical plane as the outer peripheral surface of the valve main body portion 61. The rib portions 72 extend linearly in the axial direction of the valve body 60. The rib portions 72 are arranged at equal intervals in the circumferential direction of the valve body 60, that is, at an interval of 120° (see FIG. 5). As a result of the provision of the rib portions 72, the measurement surface 62 and the measurement region 66 are divided into three portions or sections in the circumferential direction of the valve body 60.

The rear side guide 80 is formed by the flange portion 63 (more specifically, its outer peripheral portion). The flange portion 63 has on the outer peripheral surface thereof a plurality of (three in the present embodiment) sliding surfaces 82 and a plurality of (three in the present embodiment) cutout surfaces 84. The sliding surfaces 82 and the cutout surfaces 84 are alternately formed in the circumferential direction of the flange portion 63. The sliding surfaces 82 are arranged at equal intervals in the circumferential direction of the valve body 60, i.e., at an interval of 120°. Similarly, the cutout surfaces 84 are arranged at equal intervals in the circumferential direction of the valve body 60, i.e., at an interval of 120°. In the present embodiment, each cutout surface 84 is positioned between two sliding surfaces 82 that are adjacent to each other in the circumferential direction of the flange portion 63. The sliding surfaces 82 can slidably contact the upstream side passage wall surface 45 (see FIG. 3). Between the cutout surfaces 84 and the upstream side passage wall surface 45, there are formed openings 90 (see FIG. 3) through which the blow-by gas can flow.

The cutout surfaces 84 may have flat surfaces parallel to the axis 60L of the valve body 60, and may be used as reference surfaces (indicated by the same reference numerals as the cutout portions) serving as a reference at the time of configuration measurement of the measurement surfaces 62 (see FIG. 5). Therefore, the cutout surfaces 84 will be hereinafter also referred to as the reference surfaces 84. Further, the reference surfaces 84 extend tangentially with respect to the valve body 60. That is, each of the reference surfaces 84 extends along a flat plane orthogonal to a straight line that passes through the axis 60L of the valve body 60 and a midpoint between two circumferentially adjacent sliding surfaces 82. Further, the measurement surfaces 62 and the reference surfaces 84 are arranged so as to overlap each other at least partially with respect to the radial direction of the valve body 60 in the front view of the valve body 60 (see FIG. 5). In other words, a circumferential range (angular range about the axis 60) of each of the measurement surfaces 62 overlaps with at least a part of a circumferential range (angular range about the axis 60) of any of the reference surfaces 84, or a circumferential range (angular range about the axis 60) of each of the reference surfaces 84 overlaps with at least a part of a circumferential range (angular range about the axis 60) of any of the measurement surfaces 62. In the present embodiment, the measurement surfaces 62 entirely overlap the reference surfaces 84 with respect to the radial direction of the valve body 60 in the front view (see FIG. 5) of the valve body 60. The number of rib portions 72 and the number of reference surfaces 84 are both three. The sliding surfaces 72a of the rib portions 72 and the sliding surfaces 82 of the flange portion 63 may be arranged such that they overlap each other at least partially with respect to the radial direction of the valve body 60 in the front view (see FIG. 5) of the valve body 60. In the present embodiment, the sliding surfaces 72a entirely overlap the sliding surfaces 82 with respect to the radial direction of the valve body 60 in the front view (see FIG. 5) of the valve body 60.

Next, the operation of the PCV valve 40 (see FIG. 1) will be described. When the pressure within the downstream side passage portion 54 of the gas passage 50 inside the case 42 becomes lower (becomes negative) than the upstream side passage portion 52, blow-by gas may flow from the inlet 51 into the upstream side passage portion 52, and then may flow out of the case 24 after passing through the openings 90 defined by the cutout surfaces 84 of the flange portion 63, the measurement region 66, and the downstream side passage portion 54. The valve body 60 may advance or retreat (i.e., move in the axial direction) according to the difference between the upstream side pressure at the upstream side passage portion 52 and the downstream side pressure at the downstream side passage portion 54 (inclusive of the urging force of the spring 68). As a result, the flow rate of the blow-by gas flowing through the gas passage 50 may be controlled, i.e., measured. More specifically, when the upstream side pressure is larger than the downstream side pressure and the difference between the upstream side pressure and the downstream side pressure is large, the valve body 60 advances against the urging force of the coil spring 68, and therefore, the passage sectional area of the measurement region is reduced, resulting in a reduction in the flow rate of the blow-by gas. When the difference between the upstream side pressure and the downstream side pressure becomes small, the valve body 60 may retreat by the urging force of the spring 68. Therefore, the passage sectional area of the measurement region increases, resulting in an increase in the flow rate of the blow-by gas. In this way, the passage sectional area of the measurement region 66 increases or decreases, so that the flow rate of the blow-by gas flowing through the gas passage 50 can be controlled.

Further, as the valve body 60 advances or retreats, the sliding surfaces 72a of the rib portions 72 of the front side guide 70 slidably contact the inner peripheral surface of the measurement hole 53 of the case 42, and the sliding surfaces 82 of the flange portion 63 of the rear side guide 80 slidably contact the upstream side passage wall surface 45 of the gas passage 50 (see FIGS. 2 and 3). Therefore, the valve body 60 may be guided in the axial direction.

Next, an example of the configuration measurement method for checking the configuration of the measurement surfaces 62 of the valve body 60 will be described.

Figure 8:
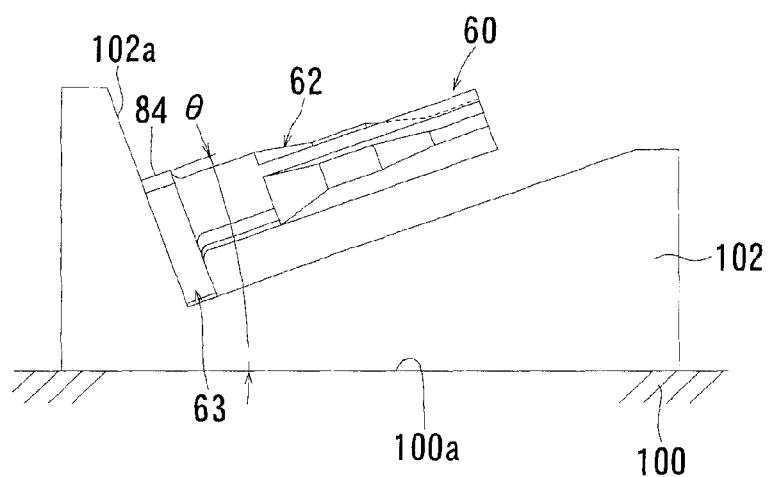
FIG. 8 is a side view showing the valve body set on a configuration measurement apparatus.

As shown in FIG. 8, a V-block 102 may be installed on a table 100 of a configuration measurement apparatus of, for example, a contact (tracer) type. The valve body 60 may be set on the V-block 102. More specifically, the valve body 60 may be set such that the measurement surface 62 to be measured and the corresponding reference surface 84 of the flange portion 63 (inclusive of the rear side guide 80) face upwards, and the rear end surface of the valve body 60 contacts in surface-to-surface contact relationship with a reference support surface 102a that is one of two surfaces defining the V-shape of the V-block 102. Therefore, the valve body 60 may be inclined by a predetermined inclination angle θ with respect to a reference flat surface 100a that is an upper surface of the table 100. Preferably, the rear end surface of the valve main body portion 61 may be bonded to the reference support surface 102a, for example, through the intermediation of a double-side tape.

Figure 9:
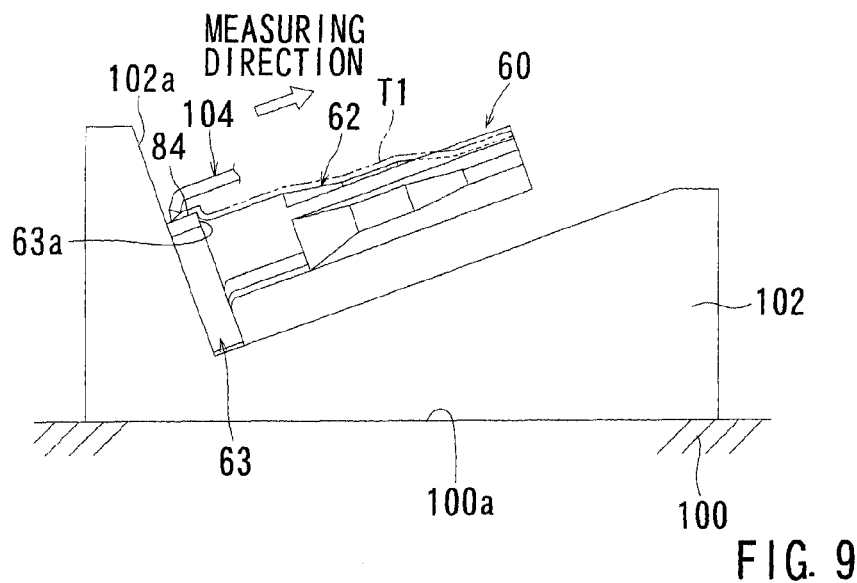
FIG. 9 is a side view showing the state when the operation for tracing by a measurement needle of a configuration measurement apparatus is started.
Figure 10:
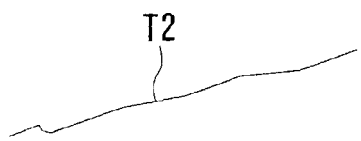
FIG. 10 is a diagram illustrating a tracing line obtained through measurement of a measurement surface of the valve body.

Next, as shown in FIG. 9, a measurement needle 104 of the configuration measurement apparatus may be placed on the reference surface 84 of the valve body 60. The, the measurement needle 104 is scanned along a measurement tracing line T1 in the axial direction, which is the measurement direction of the valve body 60 (see arrow in FIG. 9), so that the surface configuration of the valve body 60 inclusive of the reference surface 84 and the measurement surface 62 can be detected as a tracing line T2 (see FIG. 10). By moving the measurement needle 104, with the valve body 60 in an inclined state, it is possible to smoothly move the measurement needle 104 along a front end surface 63a of the flange portion 63 positioned between the reference surface 84 and the measurement surface 62. That is, it is possible to continuously perform the scanning operation of the measurement needle 104 on the measurement surface 62 of the valve body 60, starting from the reference surface 84 corresponding to the measurement surface 62 to the end portion of the measurement surface 62 via the front end surface 63a of the flange portion 63.

Figure 11:
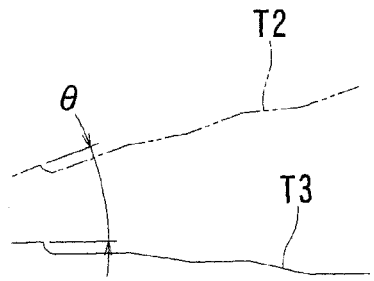
FIG. 11 is a diagram illustrating a tracing line after inclination correction of the tracing line obtained through measurement of the measurement surface of the valve body.
Figure 12:
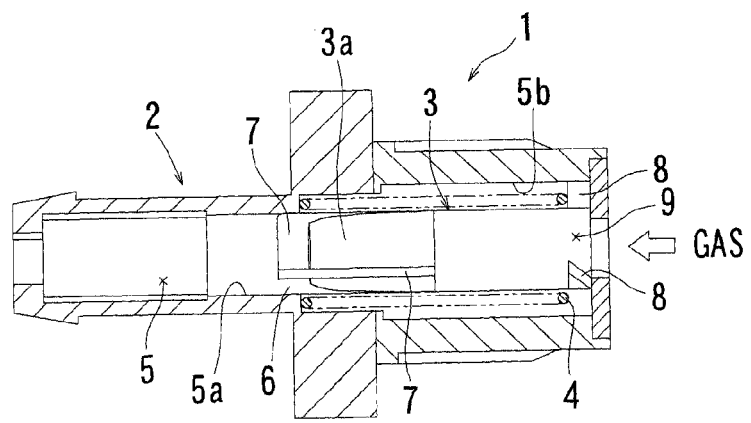
FIG. 12 is a sectional view of a known PCV valve.

Next, by using a computation processing unit (not shown) of the configuration measurement apparatus, correction may be made to the data of the tracing line T2 by an amount corresponding to the inclination angle θ, so that data of a tracing line T3 using a horizontal line as a reference can be obtained (see FIG. 11). Thereafter, the data of the tracing line T3 may be compared with data of a design reference tracing line to check the degree of coincidence, and the result of check may be displayed on a display unit (not shown). If the checking result (the degree of non-coincident in this case) exceeds an allowance, a molding surface of a mold for molding the valve body 60 may be reshaped in the case that the valve body 60 is a resin-molded product. In the case that the valve body 60 is a metal-formed product, an NC program of a machine tool may be changed. Measurement of the surface configurations of the remaining measurement surfaces 62 may be performed in the same manner as described above. Although the contact type configuration measurement apparatus is used in this embodiment, a non-contact type configuration measurement apparatus or any other measurement apparatus may be used as long as it can be used for measuring the configurations of the measurement surfaces 62.

With the above-described PCV valve 40, as the valve body 60 advances or retreats, the sliding surfaces 72a of the rib portions 72 of the front side guide 70 slide along the inner peripheral surface of the measurement hole 53 of the case 42, and the sliding surfaces 82 of the flange portion 63 of the rear side guide 80 slide along the upstream side passage wall surface 45 of the gas passage 50. Therefore, the valve body 60 is guided in the axial direction. As a result, it is possible to prevent radial run-out of the valve body 60 and to eventually improve the stability in operation of the valve body 60.

The cutout surfaces 84 are formed as the reference surfaces 84 serving as a reference at the time of the configuration measurement of the measurement surfaces 62, and the measurement surfaces 62 and the reference surfaces 84 are arranged so as to overlap each other at least partially with respect to the radial direction of the valve body 60 in the front view (see FIG. 5) of the valve body 60. Thus, it is possible to perform the configuration measurement on the measurement surfaces 62 of the valve body 60 using the reference surfaces 84 as the reference. Accordingly, the valve body 60 of the PCV valve 40 is designed to allow configuration measurement of the measurement surfaces 62.

Further, the sliding surfaces 72a of the rib portions 72 and the sliding surfaces 82 of the flange portion 63 are arranged so as to overlap each other at least partially with respect to the radial direction of the valve body 60 in the front view (see FIG. 5) of the valve body 60. Accordingly, it is possible to improve the stability in operation of the valve body 60 also in this respect.

The reference surfaces 84 are flat surfaces parallel to the axis 60L of the valve body 60. In other words, it is possible to use flat surfaces parallel to the axis 60L of the valve body 60 as the reference surfaces 84. Thus, it is possible to easily effect inclination correction at the time of configuration measurement (tracing).

The flange portion 63 has a plurality of (three in the present embodiment) cutout surfaces 84 serving as the reference surfaces 84. Accordingly, it is possible to perform configuration measurement on the plurality of measurement surfaces 62 of the valve body 60 using a plurality of reference surfaces 84 as the reference.

The rib portions 72 are arranged at equal intervals in the circumferential direction of the valve body 60. Accordingly, it is possible to improve the stability in operation of the valve body 60 also in this respect.

Further, the valve body 60 is used for the PCV valve 40 that is used in the positive crankcase ventilation system 10 (see FIG. 7) of the engine 12. Thus, the PCV valve 40 is improved in that its valve body 60 allows configuration measurement of the measurement surfaces 62 and has improved operational stability of the valve body 60.

The above embodiment may be modified in various ways. For example, the above teachings can be also applied to a flow control valve for controlling the flow rate of a gas other than blow-by gas. Further, while in the above embodiment the sliding surfaces 72a of the rib portions 72a and the sliding surfaces 82 of the flange portion 63 are arranged so as to overlap each other at least partially with respect to the radial direction of the valve body 60, it may be possible to configure such that they do not overlap each other. Further, while in the above embodiment the reference surfaces 84 are flat surfaces parallel to the axis 60L of the valve body 60, the reference surfaces 84 are not necessary to be parallel to the axis 60L as long as they can serve as a reference in the configuration measurement of the measurement surfaces 62. Thus, the reference surfaces 84 may be flat surfaces inclined with respect to the axis 60L of the valve body 60 at a predetermined angle. Further, while in the above embodiment the reference surfaces 84 extend tangentially with respect to the valve body 60, the reference surfaces 84 may be inclined with respect to the tangential directions of the valve body 60 at a predetermined angle. Further, while in the above embodiment the number of cutout surfaces 84 is three, the number may be one, two or four or more. Further, while in the above embodiment the cutout surfaces 84 are formed as the reference surfaces 84, it is also possible to form a reference surface in a part of each of the cutout surfaces. For example, the cutout surface may have a bottomed groove, and a reference surface may be formed on a bottom of the groove. Further, while in the above embodiment the rib portions 72 are arranged at equal intervals in the circumferential direction of the valve body 60, it is possible for the rib portions 72 to be arranged at unequal intervals in the circumferential direction of the valve body 60. Further, while in the above embodiment the reference surfaces 84 are arranged at equal intervals in the circumferential direction of the valve body 60, it is possible for the reference surfaces 84 to be arranged at unequal intervals in the circumferential direction of the valve body 60. Further, while in the above embodiment the number of rib portions 72 and the number of reference surfaces 84 are the same, i.e., they are both three, the number of the rib portions 72 and the number of reference surfaces 84 may be different from each other.

What is claimed is:

1. A flow control valve comprising:
a case defining therein a cylindrical fluid passage;
a valve body disposed within the fluid passage so as to be capable of axially advancing and retreating, and
a spring urging the valve body in a retreating direction, wherein:
the fluid passage includes a cylindrical measurement hole,
the valve body has an outer circumferential surface including a tapered measurement surface, so that a measurement region is defined between an inner circumferential wall of the measurement hole and the tapered measurement surface of the valve body,
a flow rate of fluid flowing though the fluid passage is controlled by adjusting a passage sectional area of the measurement region through axial movement of the valve body,
the valve body includes a front side guide and a rear side guide,
the front side guide includes a plurality of rib portions protruding radially from the measurement surface of the valve body, and having first sliding surfaces configured to slidably contact the inner circumferential wall of the measurement hole, so that the plurality of rib portions divide the measurement surface into a plurality of measurement surface portions comprising a plurality of stepped, tapered surfaces extending in straight lines in a longitudinal direction along the valve body,
the rear side guide includes a flange portion formed on a rear end portion of the valve body;
the flange portion includes a second sliding surface and a cutout surface, the sliding surface slidably contacting a passage wall surface of the fluid passage located on an upstream side of the measurement hole;
an opening is defined between the cutout surface and the passage wall surface for allowing flow of the fluid;
the cutout surface includes a reference surface configured as a flat surface and serving as a reference when performing configuration measurement of the measurement surface;
the measurement surface and the reference surface are arranged such that a diametrical line extending in a radial direction with respect to an axis of the valve body, in a front view of the valve body, intersects each of the measurement surface portions of the measurement surface at a first intersection point, and intersects the reference surface at a second intersection point; and
the second intersection point is positioned radially outward of the first intersection point.

2. The flow control valve according to claim 1, wherein the first sliding surfaces of the rib portions and the second sliding surface of the flange portion are arranged such that a diametrical line extending in a radial direction with respect to an axis of the valve body, in the front view of the valve body, intersects any one of the first sliding surfaces and the second sliding surface.

3. The flow control valve according to claim 1, wherein the reference surface extends parallel to the axis of the valve body.

4. The flow control valve according to claim 1, wherein the flange portion has a plurality of cutout surfaces each including the reference surface.

5. The flow control valve according to claim 1, wherein the rib portions are arranged at equal intervals in the circumferential direction of the valve body.

6. The flow control valve according to claim 4, wherein the reference surfaces are arranged at equal intervals in the circumferential direction of the valve body.

7. The flow control valve according to claim 4, wherein the number of the rib portions is the same as the number of the reference surfaces.

8. The flow control valve according to claim 7, wherein the number of rib portions and the number of reference surfaces are both three.

9. The flow control valve according to claim 1, wherein the flow control valve is a PCV valve for use in a positive crankcase ventilation system of an internal combustion engine.

10. The flow control valve according to claim 1, wherein the diametrical line intersects the reference surface at a right angle.

11. The flow control valve according to claim 4, wherein:
the flange portion includes a plurality of second slide surfaces arrange in a circumferential direction of the flange portion; and
each of the reference surfaces is configured as a single flat surface extending between two of the second slide surfaces arranged adjacent to each other in the circumferential direction.

\* \* \* \* \*